US005772234A

United States Patent [19]

Luo

[11] Patent Number: 5,772,234

[45] Date of Patent: Jun. 30, 1998

[54] CONFIGURING FRAME OF WALKER

[76] Inventor: Chung-I Luo, 9F, No. 108, Kuan-Chian E. Rd., Pan-Chiao City, Taipei Hsien, Taiwan

[21] Appl. No.: 935,734

[22] Filed: Sep. 23, 1997

[51] Int. Cl.[6] .......... B62B 3/02

[52] U.S. Cl. .......... 280/642; 280/87.021; 280/657; 280/47.38

[58] Field of Search .......... 280/82.01, 87.021, 280/87.02, 38, 642, 643, 657, 47.18, 47.34, 47.38, 47.4; 135/87, 66, 74; 482/66, 69; 297/5, 6

[56] References Cited

U.S. PATENT DOCUMENTS

| | | | |
|---|---|---|---|
| 3,872,945 | 3/1975 | Hickman et al. | 280/87.021 |
| 4,029,311 | 6/1977 | Chanslor et al. | 188/29 |
| 4,212,493 | 7/1980 | Ledesky | 296/6 |
| 4,253,678 | 3/1981 | Leclerc | 280/87.021 |
| 4,384,713 | 5/1983 | Detsch et al. | 280/47.34 |
| 4,770,410 | 9/1988 | Brown | 135/67 |
| 5,605,169 | 2/1997 | Light | 135/66 |

*Primary Examiner*—Richard M. Camby
*Attorney, Agent, or Firm*—Beveridge, DeGrandi, Weilacher & Young LLP

[57] ABSTRACT

The present invention relates to a configuring frame for walker which comprises a pair of front tubes which has a S-shape configuration and being provided with a caster in the lower end. The upper end of the front tube is telescopically connected with a hand grip and which has a belt socket in the end portion. A back belt is bridged between the two belt sockets such that a backrest is formed. The middle portion of the front tube is disposed horizontally when the front tube is assembled. Those two front tubes is interconnected by means of a first traverse tube which is located adjacent to the caster and a second traverse tube which is located at the middle or horizontal portion of the front tubes. A pedal is pivotally mounted at the first traverse tube. And a pair of rear tubes and which has a horizontal portion and an inclined portion which extends downward and rearward. The end of the inclined portion is mounted with a caster. Those two rear tubes is interconnected by means of a chair bracket in the horizontal portions of the rear tubes. Those char bracket defines a mounting groove for receiving and retaining the horizontal portion of the rear tube. The rear portion of the chair bracket is pivotally attached to the rear end of the front tube and the front portion of the chair bracket is rested and supported onto the second traverse rod which is attached onto the middle portion of the front tube. The chair bracket is mounted with a seat having a straps configuration. Since the rear tubes can be folded toward the front tubes and the overall dimension can be reduced and which is specially suitable for delivery and packing. Besides, the user may readily assemble it on site.

6 Claims, 9 Drawing Sheets

CONFIGURING FRAME OF WALKER

FIELD OF THE INVENTION

The present invention relates to a configuring frame, more particularly, to a configuring frame of a walker in which the walker can be converted to reduce the overall size. This reduced size is specially suitable for delivery and packing. The user may readily assembly it on side.

DESCRIPTON OF PRIOR ART

When the elder people and/or the people who suffers from a feet or leg injury may need a walker for walk help. The walker is provided with a pair of wheels which make the walk more easy to manipulate. The user can be well supported and prevented from falling down by this walker during his/her walk. In the early stage, the walker has a rectangular frame and the user shall lift and put a further farther before his/her next step. However, when the user hopes to take a rest, the conventional walker is a simple frame which does provide a seat for rest of the user. In light of this, it is quite inconvenient for the user.

On the other hand, lifting up the conventional walker and putting it a farther more is extremely difficult to those weak people when use it as a walk help. Accordingly, those weak people can not receive help from the rectangular walker. On the other hand, the conventional rectangular walker has four legs and the walker will be come unstable when only two legs stand on the floor. In this situation, the user may readily get fall down if he/she rests all his/weight on the walker.

In order to make the walker more readily to manipulate, the four legs of the walker are provided with a caster respectively. Accordingly, the user may readily use the walker having casters for walk help. Furthermore, the conventional walker is also mounted with a seat with which the user can take a rest when he/she is tired. This is really beneficial to the elder or weak people. However, the conventional walker does not has a convertible configuration, i.e. it can not be folded for delivery or storage. As a result, it occupies a larger space and is not suitable to be carried on the trunk.

As the conventional walker is not convertible configured, it is not suitable for packing and delivery. In light of this, there is still a room for improving the conventional walker.

SUMMARY OF THE INVENTION

It is the objective of this invention to provide a configuring frame of the walker which can be converted to reduce the overall size. This reduced size is specially suitable for delivery and packing. The user may readily assembly it on side.

In order to achieve the objective set forth, the configuring frame for walker which comprises a pair of front tubes which has a S-shape configuration and being provided with a caster in the lower end. The upper end of the front tube is telescopically connected with a hand grip and which has a belt socket in the end portion. A back belt is bridged between the two belt sockets such that a backrest is formed. The middle portion of the front tube is disposed horizontally when the front tube is assembled. Those two front tubes is interconnected by means of a first traverse tube which is located adjacent to the caster and a second traverse tube which is located at the middle or horizontal portion of the front tubes. A pedal is pivotally mounted at the first traverse tube. And a pair of rear tubes and which has a horizontal portion and an inclined portion which extends downward and rearward. The end of the inclined portion is mounted with a caster. Those two rear tubes is interconnected by means of a chair bracket in the horizontal portions of the rear tubes. Those char bracket defines a mounting groove for receiving and retaining the horizontal portion of the rear tube. The rear portion of the chair bracket is pivotally attached to the rear end of the front tube and the front portion of the chair bracket is rested and supported onto the second traverse rod which is attached onto the middle portion of the front tube. The chair bracket is mounted with a seat having a straps configuration. Since the rear tubes can be folded toward the front tubes and the overall dimension can be reduced and which is specially suitable for delivery and packing. Besides, the user may readily assemble it on site.

According to another aspect of the present invention, the pedal can be extended while the back belt can be routed backward such that the walker can be converted into a wheelchair for the user. The application can be therefore increased.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

Figure 1:
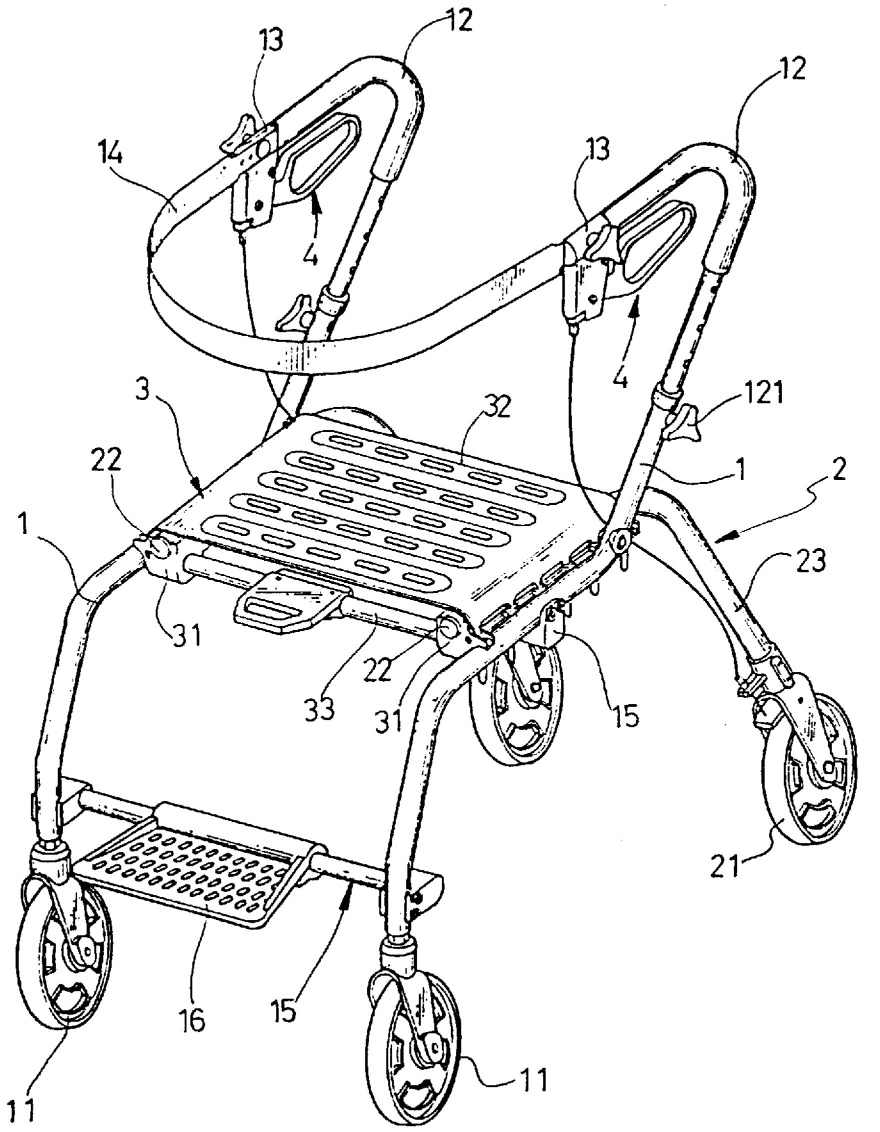
FIG. 1 is a perspective view of the configuring frame of the walker.
Figure 2:
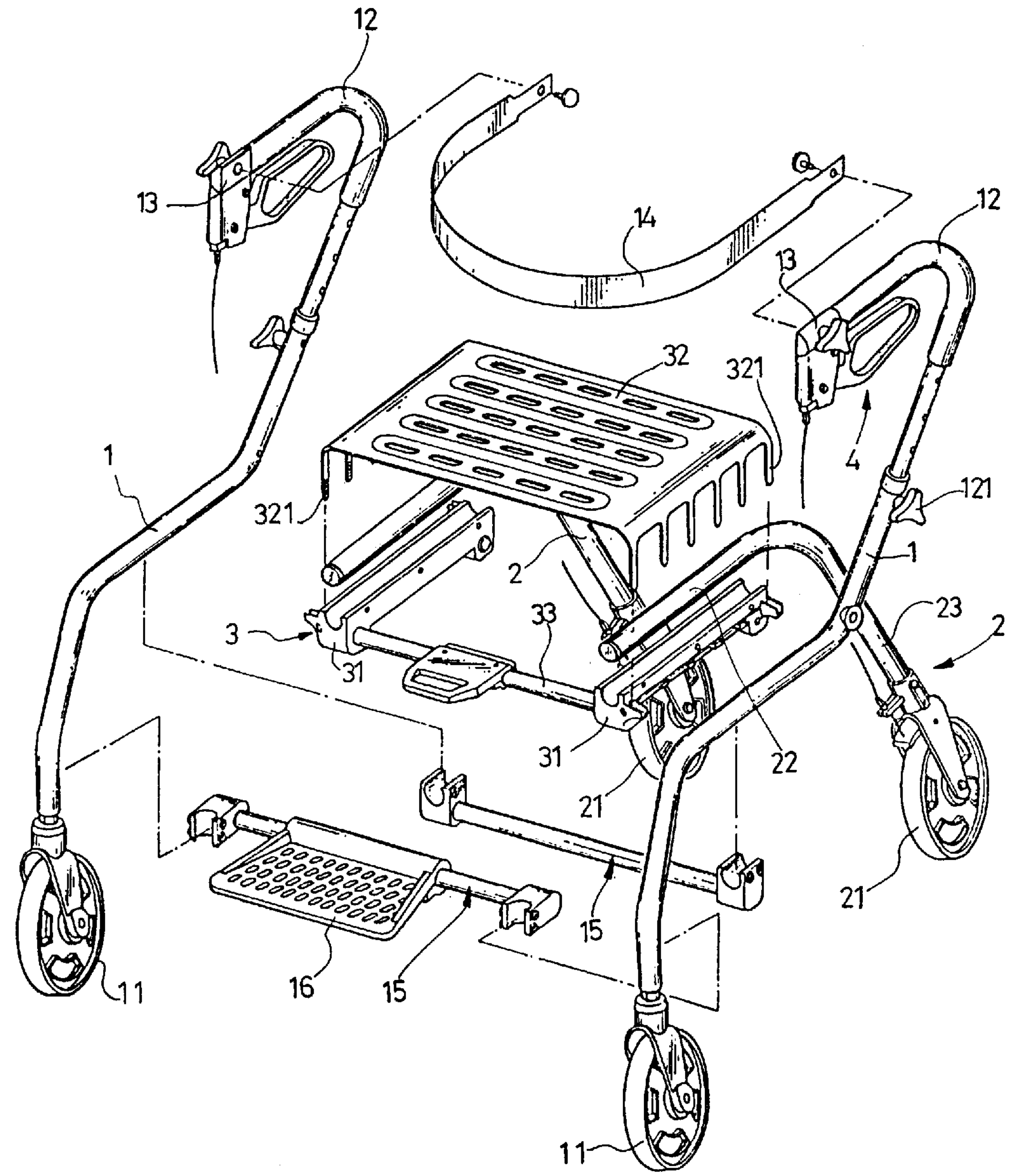
FIG. 2 is an exploded perspective view of the configuring frame.

Referring to FIGS. 1 and 2, the configuring frame for walker generally comprises a pair of front tubes 1 which has a S-shape configuration and is provided with a caster 11 in the lower end. The upper end of the front tube 1 is telescopically connected with a hand grip 12 and which has a belt socket 13 in the end portion. A back belt 14 can be bridged between two belt sockets 13 such that a backrest is formed. The middle portion of the front tube 1 is disposed horizontally when the front tube 1 is assembled. Those two front tubes 1 are interconnected by means of a pair of traverse tubes 15 which are anchored at suitable position of the front tubes 1. In this preferred embodiment, the first traverse tube 15 is located adjacent to the caster 11 and the second traverse tube 15 is located at the middle or horizontal portion ofthe front tubes 1. A pedal (16) is pivotally mounted at the first traverse tube 15.

A pair of rear tubes 2 are also provided and which has a horizontal portion 22 and an inclined portion 23 which extends downward and rearward. The end of the inclined portion is mounted with a caster 21. Those two rear tubes 2 are interconnected by means of a chair bracket 3 in the horizontal portions of the rear tubes 2. The char bracket 3 defines a mounting groove 311 for receiving and retaining the horizontal portion 22 of the rear tube 2. The rear portion of the chair bracket 3 is pivotally attached to the rear end of the front tube 1 and the front portion of the chair bracket 3 is rested and supported onto the second traverse rod 15 which attached onto the middle portion of the front tube 1. The chair bracket 3 is mounted with a seat 32 having a straps configuration.

Figure 3:
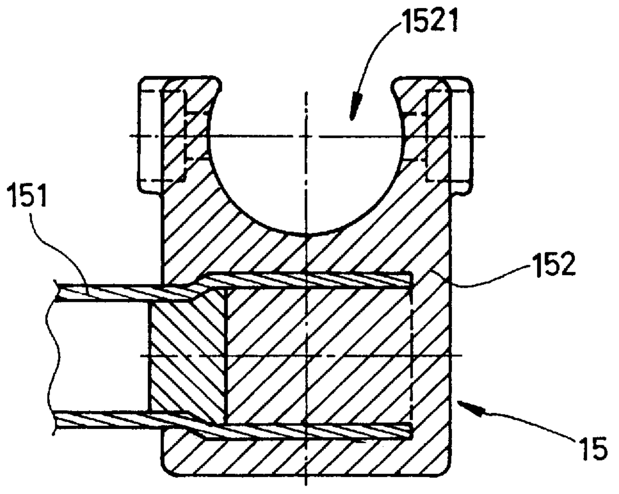
FIG. 3 is a cross sectional view of the traverse rod.

Referring to FIG. 3, the traverse rod 15 includes a telescopic tubular base 151 integrally formed with a fastener 152 at the end portion. The fastener 152 is provided with a connecting cutout 1521 with which the front tube 1 is received and retained thereof By this arrangement, those front tubes 1 can be interconnected one another.

Figure 4:
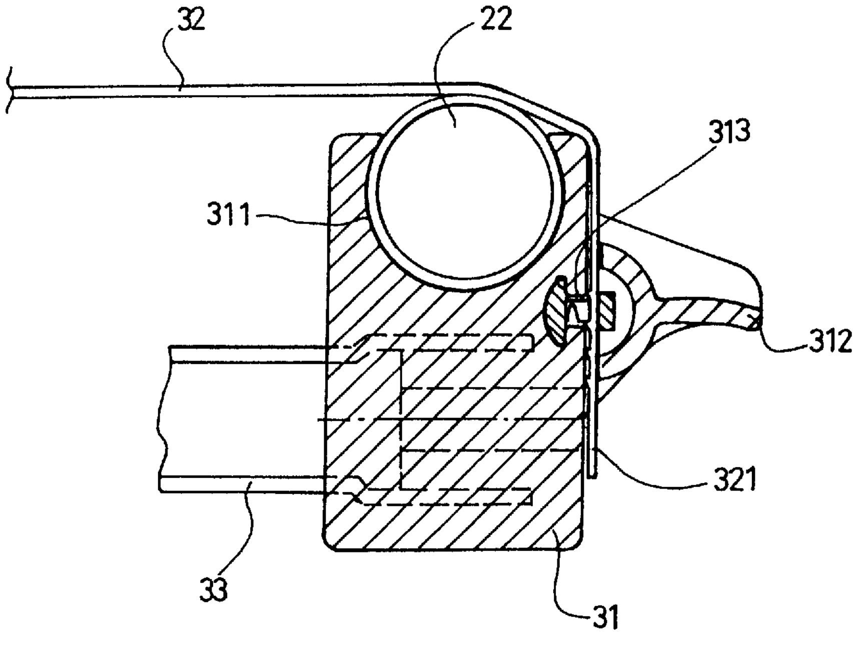
FIG. 4 is a cross sectional view of the chair bracket.
Figure 5:
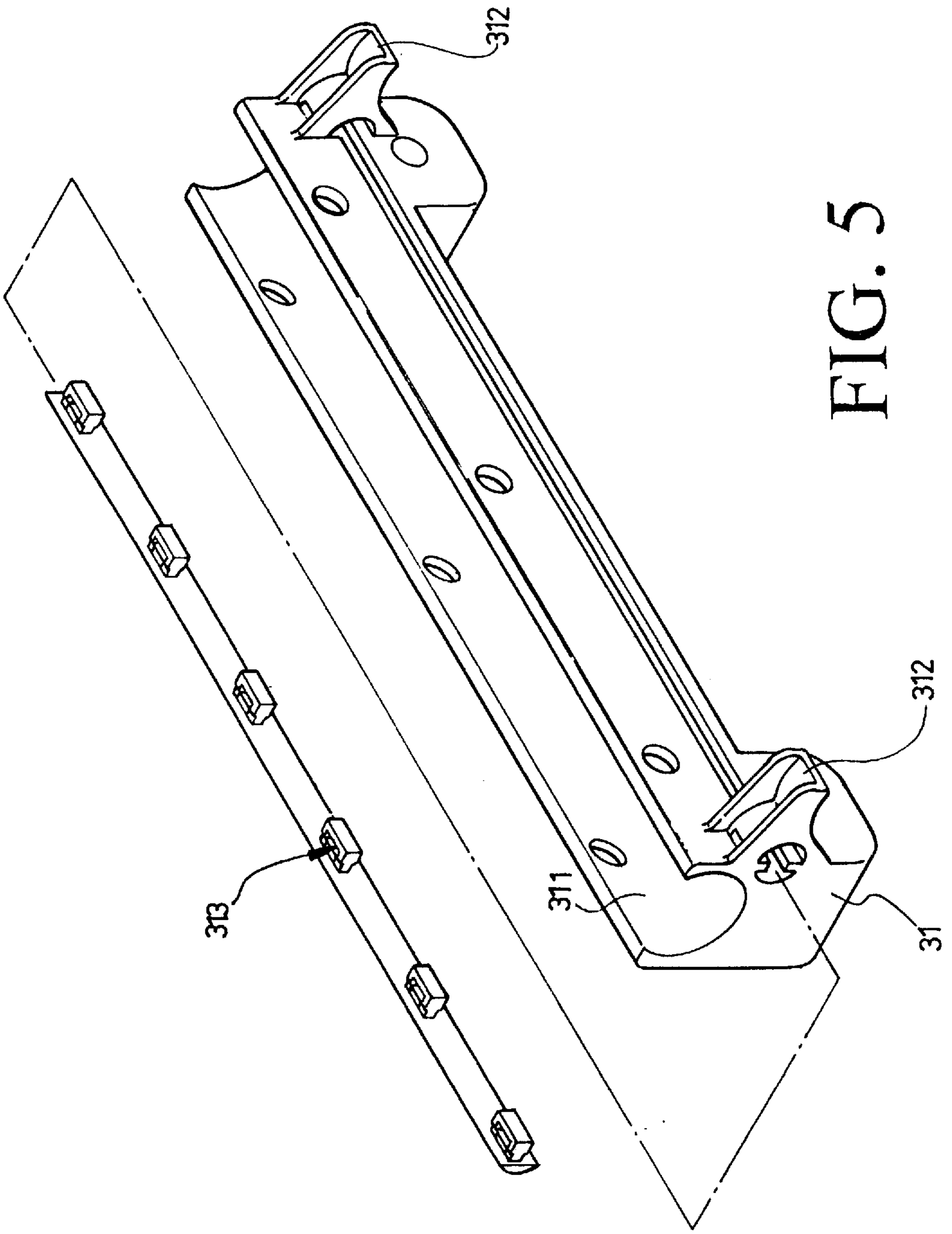
FIG. 5 is a perspective view of the connecting rod of the chair bracket.

Referring to FIGS. 4 and 5, the chair bracket 3 includes a basic truss 33 which is integrally connected with a connecting rack 31 at both ends. The connecting rack 31 defines a receiving groove 311 thereabove in which the horizontal portion 22 of the rear tube 2 is received and retained thereof. The connecting truss 31 is further provided with a hooking portions 312 which is abutted against the front tube 1. The connecting rack 31 further includes a plurality of mounting holes 313. Both sides of the seat 32 are also provided with a plurality of teeth belt 321 and each is corresponding to one of the mounting holes 313. By the engagement of the teeth belts 321 and the mounting holes 313, the seat 32 can be fixedly attached to the chair bracket 3.

As shown in FIG. 1, a braking device 4 can be mounted on the rear caster 21 of the rear tube 2 and which is triggered by a braking handle pivotally attached on the hand grip 12 of the front tube 1. By this arrangement, when the braking handle is triggered, the rear caster 21 can be braked by the braking device 4. Accordingly, the user can be prevented from falling down resulted from the out-control of the walker. By the provision of the braking device 4, the walker may provide substantial help to the user for moving forward.

Figure 6:
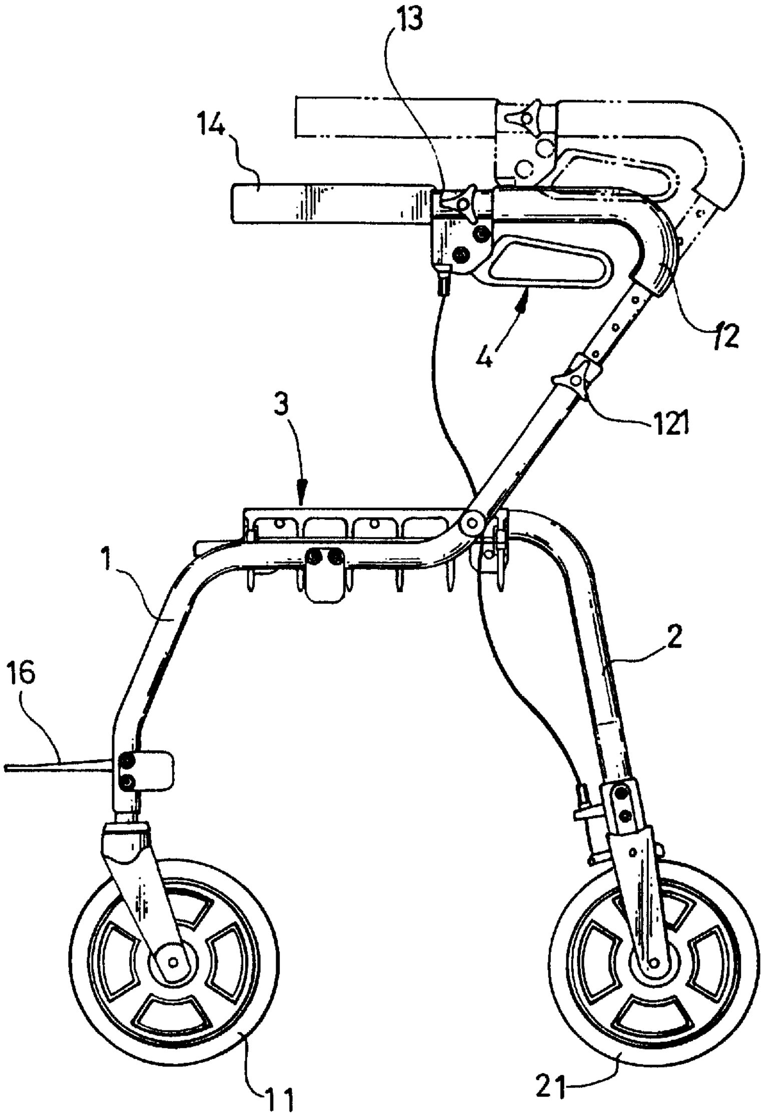
FIG. 6 is a side elevational view of the configuring frame.
Figure 7:
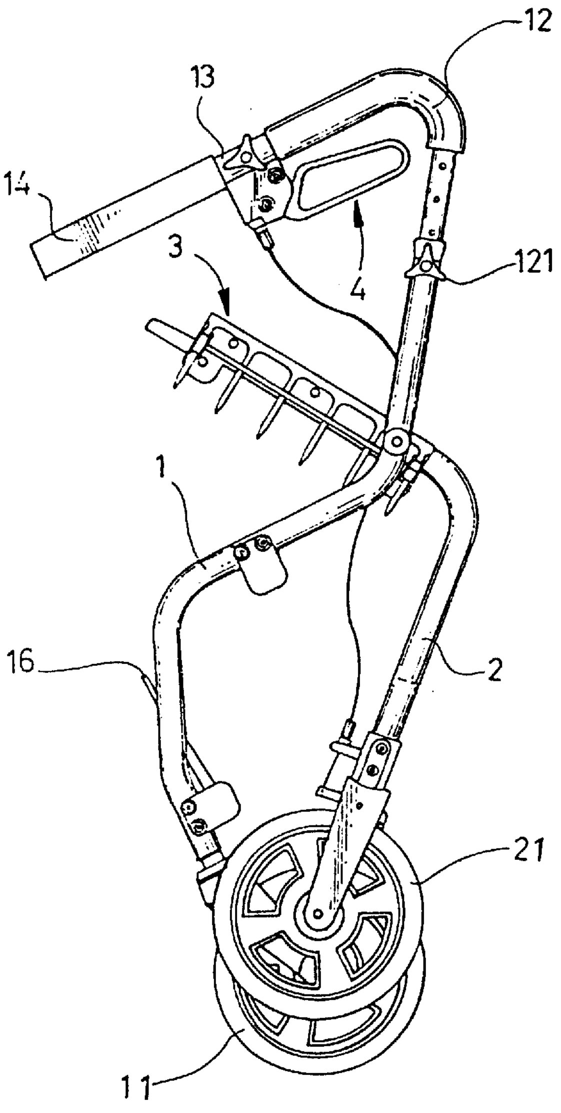
FIG. 7 is a side elevational view of the configuring frame when completely folded.

As shown in FIG. 6, the hand grip 12 is telescopically mounted at the upper end of the front tube 1, as a result, the extending length of the hand grip 12 can be readily adjusted by a locking bolt 121 which is passed through the tubular wall of the front tube 1 and abutted against the extending of the hand grip 12. By this arrangement, the user may select a suitable height according to his/her own requirement.

In assembling, those two front tubes 1 are interconnected by means of the first and second traverse rods 15 in suitable positions. The tubular wall of the front tube 1 is firstly seated into the connecting cutout 1521 of the fastener 152, then a locking screw can be applied to passed through the fastener 152 such that the connecting cutout 1521 is fixedly connected with the tubular wall of the front tube 1.

On the other hand, the rear tubes 2 are also firstly interconnected by the chair bracket 3. In assembling, the horizontal portion 22 of the rear tube 2 is received firstly into the receiving groove 311 of the connecting rack 31. Then a plurality of locking screws are applied to pass through the receiving groove 311 such that the horizontal portion 22 is fixedly connected with the connecting groove 311 of the connecting rack 3. Then the sub-assembly configured by the chair bracket 3 and the rear tubes 2 are pivotally attached to the rear portion of the front tube 1, while a back belt 14 is bridged between the belt sockets 13 of the hand grip 12. The back belt 14 is fixedly attach to the belt socket 13 by means of locking bolt.

Since all the connections between the configuring components are made by locking bolts, as a result, the walker configured therefrom can be readily disassembled for storage and delivery.

From the forgoing description, it can be readily appreciated that since the sub-assembly configured by the chair bracket 3 and the rear tubes 2 is pivotally attached to the front tubes 1, and the chair bracket 3 is also rested and supported by the second traverse rod 15 which is located at the horizontal portion of the front tubes 1. Besides, the hooking portions 312 of the connecting rack 31 of the chair bracket 3 are removably engaged with the horizontal portion of the front tubes 1. As the chair bracket 3 is fixedly disposed thereof, this walker is ready for use. When the walker is not for use, the chair bracket 3 can be readily pivoted upward such that the horizontal portion of the front tubes 1 is released from the hooking portion 312 of the connecting rack 31. As a result, the rear tubes 2 are folded toward the front tubes 1 to reduce the over all configuration.

As described above, the traverse rod 15 is configured with a telescopic tubular base 151 and the base truss 33 of the chair bracket 3 is also configured with a telescopic configuration. By this arrangement, the distance between those two front and rear tubes 1 and 2 can be readily adjusted for different users.

Figure 8:
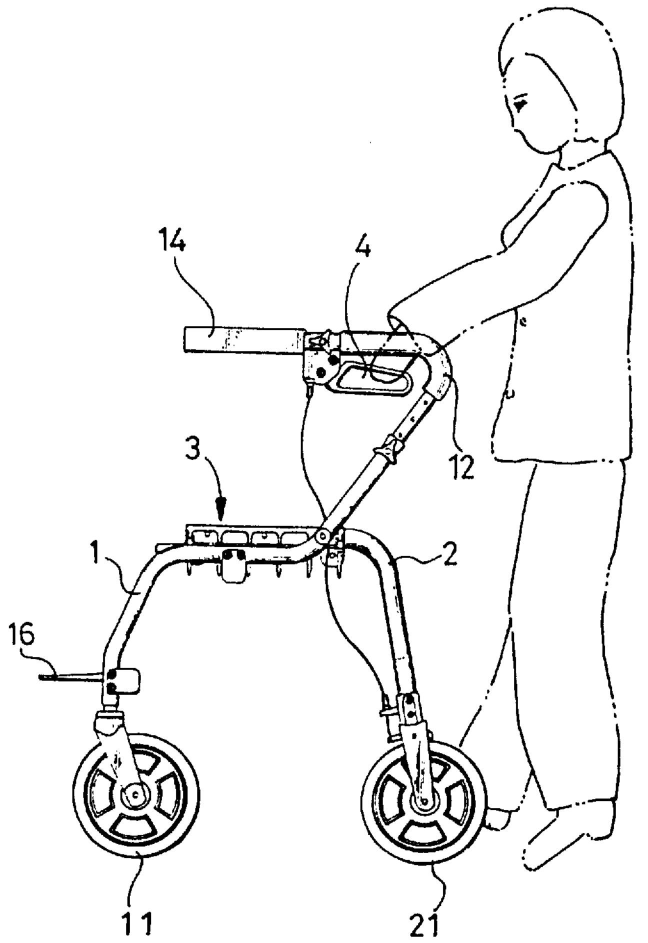
FIG. 8 is a schematic illustration for the configuring frame in a first application.
Figure 9:
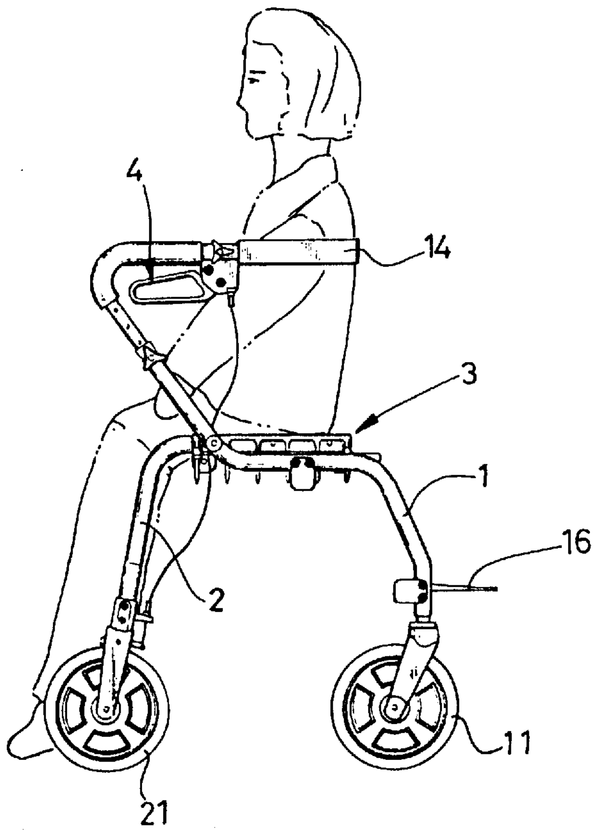
FIG. 9 is still a schematic illustration for the configuring frame in a second application.

As shown in FIG. 8, the user may rest his/her both hands onto the hand grips 12 in use. By manipulating the braking handle of the braking device 4, the user may readily use this walker for walk. When the user it tired, he/she may sit onto the chair bracket 3 for a rest, as shown in FIG. 9.

Figure 10:
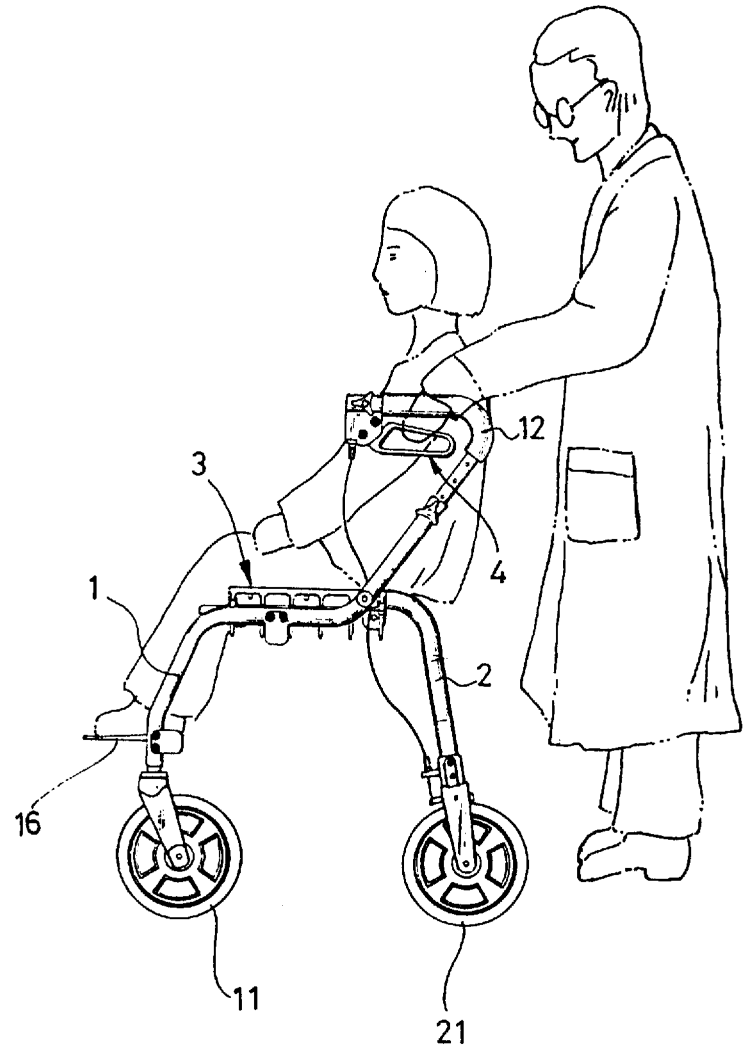
FIG. 10 is still a schematic illustration for the configuring frame in a third application.

As shown in FIG. 10, this walker can be also converted into a wheelchair when the pedal 16 is extended and the back belt 14 is routed backward. As a result, the user may sit onto the chair bracket 3 while his/her legs is supported by the pedal 16 and the back is supported by the back belt 14. By this arrangement, the flexibility of the walker is increased.

I claim:

1. A configuring frame for walker, comprising:

a pair of front tubes which has a S-shape configuration and being provided with a caster in the lower end, the upper end of said front tube being telescopically connected with a hand grip and which has a belt socket in the end portion, a back belt being bridged between said two belt sockets such that a backrest is formed, the middle portion of said front tube being disposed horizontally when the front tube is assembled, saids two front tubes being interconnected by means of a first traverse tube which is located adjacent to said caster and a second traverse tube which is located at the middle or horizontal portion of said front tubes, a pedal being pivotally mounted at said first traverse tube; and a pair of rear tubes and which has a horizontal portion and an inclined portion which extends downward and rearward, the end of said inclined portion being mounted with a caster, said two rear tubes being interconnected by means of a chair bracket in said horizontal portions of said rear tubes, said chair bracket defining a mounting groove for receiving and retaining the horizontal portion of said rear tube, the rear portion of said chair bracket being pivotally attached to the rear end of said front tube and the front portion of said chair bracket being rested and supported onto said second traverse rod which is attached onto said middle portion of said front tube, said chair bracket being mounted with a seat having a straps configuration.

2. A configuring frame of walker as recited in claim 1, wherein said traverse rod includes a telescopic tubular base integrally formed with a fastener at the end portion thereof, said fastener being provided with a connecting cutout with which said front tube is received and retained thereof.

3. A configuring frame of walker as recited in claim 1, wherein said chair bracket includes a basic truss which is integrally connected with a connecting rack at both ends thereof, said connecting rack defining a receiving groove thereabove in which said horizontal portion of said rear tube is received and retained thereof, said connecting truss being further provided with a hooking portions which is abutted against said front tube, said connecting rack further including a plurality of mounting holes thereof, both sides of said seat being also provided with a plurality of teeth belt and each being corresponding to one of said mounting holes such that said seat can be fixedly attached to said chair bracket.

4. A configuring frame of walker as recited in claim 1, wherein a braking device can be mounted on said rear caster of said rear tube and which is triggered by a braking handle pivotally attached on said hand grip of said front tube.

5. A configuring frame of walker as recited in claim 1, wherein said hand grip is telescopically mounted at the upper end of the front tube by means of a locking bolt which is passed through the tubular wall of said front tube and abutted against the extending of the hand grip to adjust a suitable height.

6. A configuring frame of walker as recited in claim 1, wherein a said back belt can be routed backward onto said hand grip while said pedal can be extended to convert said walker into a wheelchair.

* * * * *